United States Patent
Madgwick

(10) Patent No.: US 10,237,160 B2
(45) Date of Patent: *Mar. 19, 2019

(54) DISTRIBUTED MONITORING AND CONTROL OF NETWORK COMPONENTS

(71) Applicant: JOHN RYAN PERFORMANCE, INC., Minneapolis, MN (US)

(72) Inventor: Gary Paul Madgwick, Lightwater (GB)

(73) Assignee: John Ryan Performance, Inc., Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/692,657

(22) Filed: Aug. 31, 2017

(65) Prior Publication Data

US 2017/0366439 A1 Dec. 21, 2017

Related U.S. Application Data

(63) Continuation of application No. 15/609,675, filed on May 31, 2017, which is a continuation of application No. 14/720,261, filed on May 22, 2015, now Pat. No. 9,674,068, which is a continuation of application No. 13/674,618, filed on Nov. 12, 2012, now Pat. No. 9,049,130.

(60) Provisional application No. 61/558,830, filed on Nov. 11, 2011.

(51) Int. Cl.
*G06F 15/173* (2006.01)
*H04L 12/26* (2006.01)
*H04L 29/08* (2006.01)

(52) U.S. Cl.
CPC .......... *H04L 43/12* (2013.01); *H04L 43/0817* (2013.01); *H04L 67/02* (2013.01); *H04L 43/06* (2013.01)

(58) Field of Classification Search
CPC ............................... H04L 43/16; H04L 41/06
USPC .................................................. 709/224–225
See application file for complete search history.

(56) References Cited

U.S. PATENT DOCUMENTS

| | | |
|---|---|---|
| 5,483,631 A | 1/1996 | Nagai |
| 6,456,306 B1 | 9/2002 | Chin |
| 7,297,018 B2 | 11/2007 | Caveney et al. |
| 7,839,299 B2 | 11/2010 | Hirose |

(Continued)

*Primary Examiner* — Duyen M Doan
(74) *Attorney, Agent, or Firm* — Dorsey & Whitney LLP

(57) ABSTRACT

A distributed monitoring system and a computer-implemented method monitors and controls locally situated network components through a monitoring and control device or processor querying the network component operating parameters and sending control commands for controlling the parameters queried. Reports of the status of the monitored network components are periodically generated from throughout the network and sent to a remotely located status viewing station configured to generate a monitoring interface and display the operational status of the network based on the status reports. If necessary, the status viewing station automatically transmits instructions, or a user enters instructions into the status viewing station, for instructing action to be taken by the monitoring and control device or processor, e.g., to adjust one or more operating parameters queried. The distributed monitoring system may be particularly useful in monitoring and managing the health of a digital signage network.

19 Claims, 9 Drawing Sheets

(56) References Cited

U.S. PATENT DOCUMENTS

| | | |
|---|---|---|
| 8,543,714 B2 | 9/2013 | Chan |
| 9,100,288 B1* | 8/2015 | Ganjam ............. H04N 21/2662 |
| 9,267,815 B2 | 2/2016 | Kuroiwa |
| 2002/0078441 A1 | 6/2002 | Drake |
| 2002/0180579 A1 | 12/2002 | Nagaoka |
| 2004/0068549 A1 | 4/2004 | Motoyama |
| 2005/0108389 A1* | 5/2005 | Kempin ................ H04L 43/065 |
| | | 709/224 |
| 2005/0160168 A1 | 7/2005 | Takanashi |
| 2006/0277446 A1 | 12/2006 | Ikeno et al. |
| 2007/0050836 A1 | 3/2007 | Stanek |
| 2007/0169047 A1 | 7/2007 | Na |
| 2008/0077490 A1* | 3/2008 | Wolf ..................... G06Q 90/20 |
| | | 705/323 |
| 2008/0301189 A1* | 12/2008 | Petit ................. G06F 17/30772 |
| 2009/0012880 A1 | 1/2009 | Tortola |
| 2009/0063274 A1* | 3/2009 | Dublin, III ............ G06Q 30/02 |
| | | 705/14.1 |
| 2009/0124279 A1 | 5/2009 | Guerra |
| 2009/0198843 A1 | 8/2009 | Lin |
| 2009/0228738 A1 | 9/2009 | Michaelson |
| 2010/0118200 A1* | 5/2010 | Gelman .................. G06F 3/041 |
| | | 348/578 |
| 2011/0210952 A1 | 9/2011 | Safavi |
| 2012/0036392 A1* | 2/2012 | Michaelson ........ G06F 11/2025 |
| | | 714/4.11 |
| 2012/0144032 A1* | 6/2012 | Read ....................... H04Q 9/00 |
| | | 709/224 |
| 2017/0264523 A1 | 9/2017 | Madgwick |

\* cited by examiner

DISTRIBUTED MONITORING AND CONTROL OF NETWORK COMPONENTS

CROSS REFERENCE TO RELATED APPLICATIONS

This application is a continuation of U.S. patent application Ser. No. 15/609,675 filed May 31, 2017 which is a continuation of U.S. patent application Ser. No. 14/720,261 filed May 22, 2015, issued as U.S. Pat. No. 9,674,068 on Jun. 6, 2017, which is a continuation of U.S. patent application Ser. No. 13/674,618 filed Nov. 12, 2012, issued as U.S. Pat. No. 9,049,130 on Jun. 2, 2015, which claims priority to U.S. Patent Application No. 61/558,830 filed Nov. 11, 2011, the contents of all of which are hereby incorporated by reference.

FIELD OF THE INVENTION

Systems and methods provide distributed monitoring and control of network components including display devices. More specifically, the network components may be locally monitored and controlled utilizing monitoring and control devices of the distributed monitoring systems provided herein.

BACKGROUND

Typically, monitoring systems implemented by a network provide sequential monitoring and status updates from numerous remotely located network components. As shown in FIG. 1, sequential monitoring system 100 uses a central server 110 to query remotely located network devices 120, 130, 140 in sequence on a periodic basis. During sequential monitoring, the central server 110 connects directly to each network device within a remote location via WAN, and then asks each device to report back in turn (i.e., the central IP approach). It takes approximately 4 to 5 seconds for each network component to report back to the central server 110 on its status. This means that for a 3000-device network it will take approximately 3.5 hours for every device to be connected to and to have reported back to the central server 110. See FIG. 2. If a device reports that it is operating correctly but subsequently malfunctions, the location housing the remote device will not be notified until the next time the server contacts the location (i.e., another 3.5 hours). The result is that the system provides information that is hopelessly out of date. Moreover, when a command or update is to be implemented across the entire network, the central server connects to each network component individually and in sequence (i.e., the process would take 3.5 hours). In addition, sequential monitoring systems generally do not provide automatic alerts when there is a problem. This means that it is necessary for a user to laboriously and manually sift through reports to find problems. Furthermore, as the number of monitored network components increases, the amount of time it takes the central server to send queries and receive updates increases. Thus, in networks with a large number of monitored network components, the central server performing sequential monitoring is an inefficient means for status monitoring because validating network health takes too long, data is not provided in real time, commands take too long to execute and automatic alerts are not provided upon identifying a problem. Monitoring is sequential in many network systems, including those that deliver content to POS displays, and disruption can cause a lost sale opportunity and possible loss of advertiser revenue.

SUMMARY

Implementations address the above problems by providing distributed monitoring systems and methods that utilize locally situated monitoring and control devices to monitor other locally situated network components such as display devices. The monitoring and control devices send status requests to, and receive status updates from, the network devices and provide status reports to a communicatively coupled, but remotely located, status viewing station. This enables the distributed monitoring systems to utilize the monitoring and control devices to connect to multiple network devices (e.g., monitors and players) and receive status reports from the devices as well as from the monitoring and control device itself. The monitoring and control devices each generate a single report for the status of the queried components and send the report to the status viewing station where a group of reports from throughout the network are assembled and displayed for user review. If necessary, the status viewing station automatically transmits instructions, or the user enters instructions into the status viewing station, for instructing the monitoring and control devices to take action, e.g., to adjust one or more operating parameters queried. The status reports from throughout the network are received by the status viewing station approximately every five minutes and the reports provide automatic alerts of problems associated with the network components thereby allowing problems throughout the network to be addressed.

According to certain aspects, a distributed monitoring system for monitoring and controlling network components includes display devices configured to display content, monitoring and control devices (e.g., with a memory and a processor) communicatively coupled to the display devices, and a status viewing station (e.g., with a memory, processor and a display monitor) remotely located from the monitoring and control devices and the display devices. The monitoring and control devices query one or more parameters of the plurality of display devices and send control commands to the display devices for controlling the parameters queried. The status viewing station receives status reports generated by the monitoring and control devices that include the operational status for the one or more parameters queried. In response, the status viewing station generates a monitoring interface that displays the operational status of the network based on the received status reports.

In other aspects, a computer-implemented method for monitoring and controlling components in a network includes a plurality of monitoring processors, where each monitoring processor is communicatively coupled to a plurality of network components. The monitoring processors are each configured to: monitor the plurality of network components by querying one or more operating parameters of the plurality of network components; detect operating parameters of the plurality of network components based on receiving operating parameter updates from the plurality of network components; assemble a report identifying an operational status for each of the plurality of monitored network components based on the detected operating parameters; and transmit the report. A status viewing processor remotely located from the plurality of monitoring processors, is configured to: receive a plurality of the transmitted reports from the plurality of monitoring processors in the network; identify operating errors for one or more of the monitored network components; and transmit instructions for addressing the operating error to the remotely located monitoring processor having transmitted the report with the operational status for the network component with the operating error.

In further aspects, a digital signage network configured with a distributed monitoring system for monitoring and controlling network components includes a plurality of local monitoring and control environments. The monitoring and control environments each include a content player configured to transmit content to display devices within the local monitoring and control environment and a monitoring and control device. The monitoring and control device is configured to: monitor an operational status of the content player and display devices by querying the content player and display devices; detect operating parameters of the content player and display devices based on receiving operating parameter updates therefrom; assemble a report identifying an operational status for the local monitoring and control environment based on the detected operating parameters; and transmit the operational status report. A status viewing station remotely located from the local monitoring and control environments includes a processor configured to: receive the transmitted operational status reports from each local monitoring and control environment; and generate a display listing an operational status of each local monitoring and control environment based on the plurality of reports received.

In other aspects, a digital signage network configured with a distributed monitoring system for monitoring and controlling network components includes a plurality of local monitoring and control environments comprising a monitoring and control device and network components, the network components comprising a content player configured to transmit content to display devices within the local monitoring and control environment, wherein the monitoring and control device is configured to: detect and fix problems with the monitored network components, assemble a report of the operational status for the local monitoring and control environment using information about the detected and fixed problems, and transmit the operational status report; and a status viewing station remotely located from the local monitoring and control environments, wherein the status viewing station comprises a processor configured to receive the transmitted operational status reports from each local monitoring and control environment, and generate a display listing an operational status of each local monitoring and control environment based on the plurality of reports received.

In yet other aspects, a digital signage network configured with a distributed monitoring system for monitoring and controlling network components includes a plurality of local monitoring and control environments comprising a monitoring and control device and network components, the network components comprising a content player configured to transmit content to display devices within the local monitoring and control environment, wherein the monitoring and control device is configured to receive status updates for programming or software, install programming or software updates in the monitored network components, assemble a report of the operational status for the local monitoring and control environment using information about the installed updates, and transmit the operational status report; and a status viewing station remotely located from the local monitoring and control environments, wherein the status viewing station comprises a processor configured to: receive the transmitted operational status reports from each local monitoring and control environment, and generate a display listing an operational status of each local monitoring and control environment based on the plurality of reports received.

BRIEF DESCRIPTION OF THE DRAWINGS

FIGS. 3A and 3B illustrate diagrams of a distributed monitoring system according to certain implementations.

FIG. 8 is a screen shot of an update status tab that enables a user to view the status of updates across the network of monitored components according to certain implementations.

FIG. 9 is a screen shot of a schedule information tab that may enable users to view playlists scheduled to play on the display devices across the network according to certain implementations.

DETAILED DESCRIPTION

Figure 1:
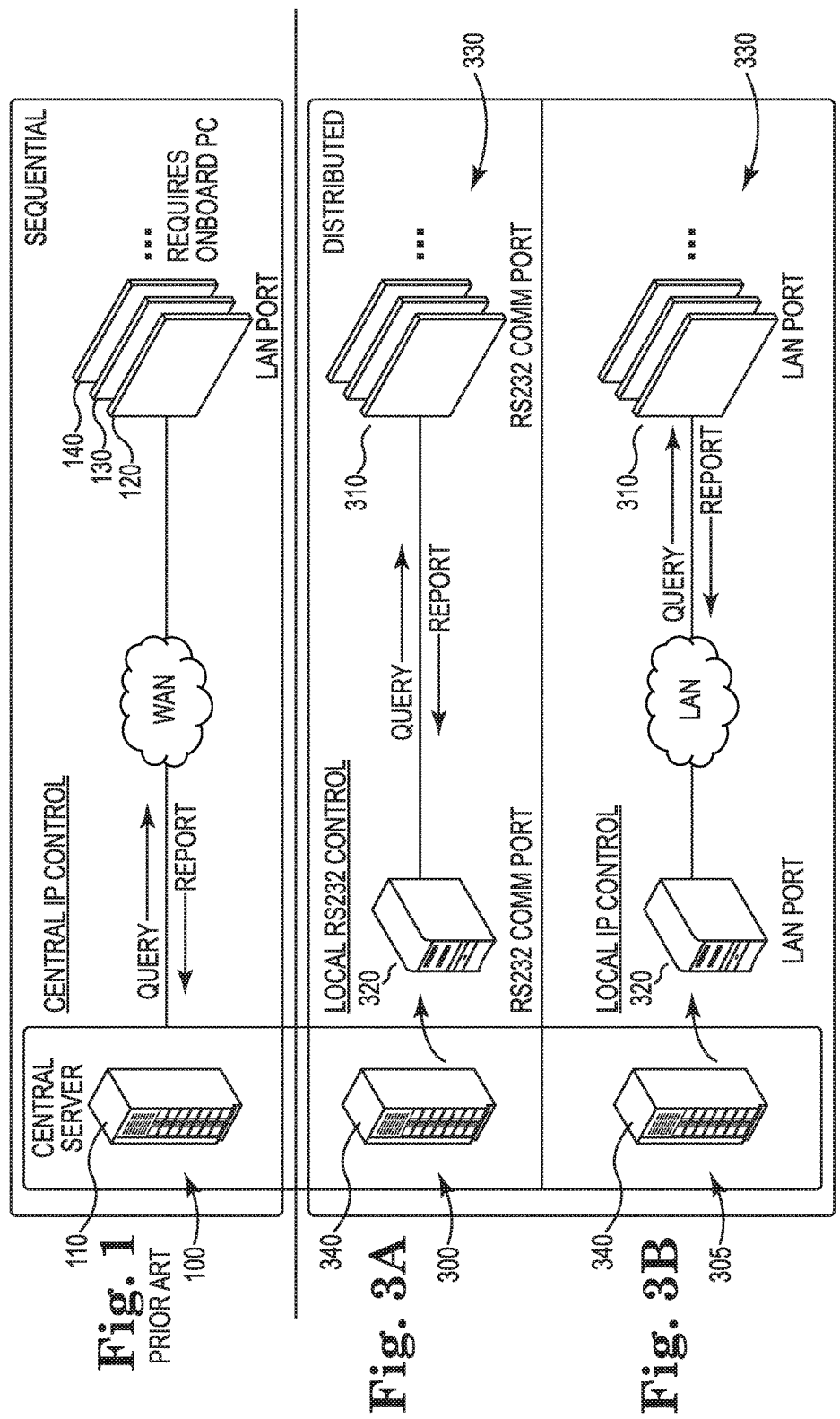
FIG. 1 illustrates a diagram of a sequential monitoring system according to the prior art.
Figure 2:
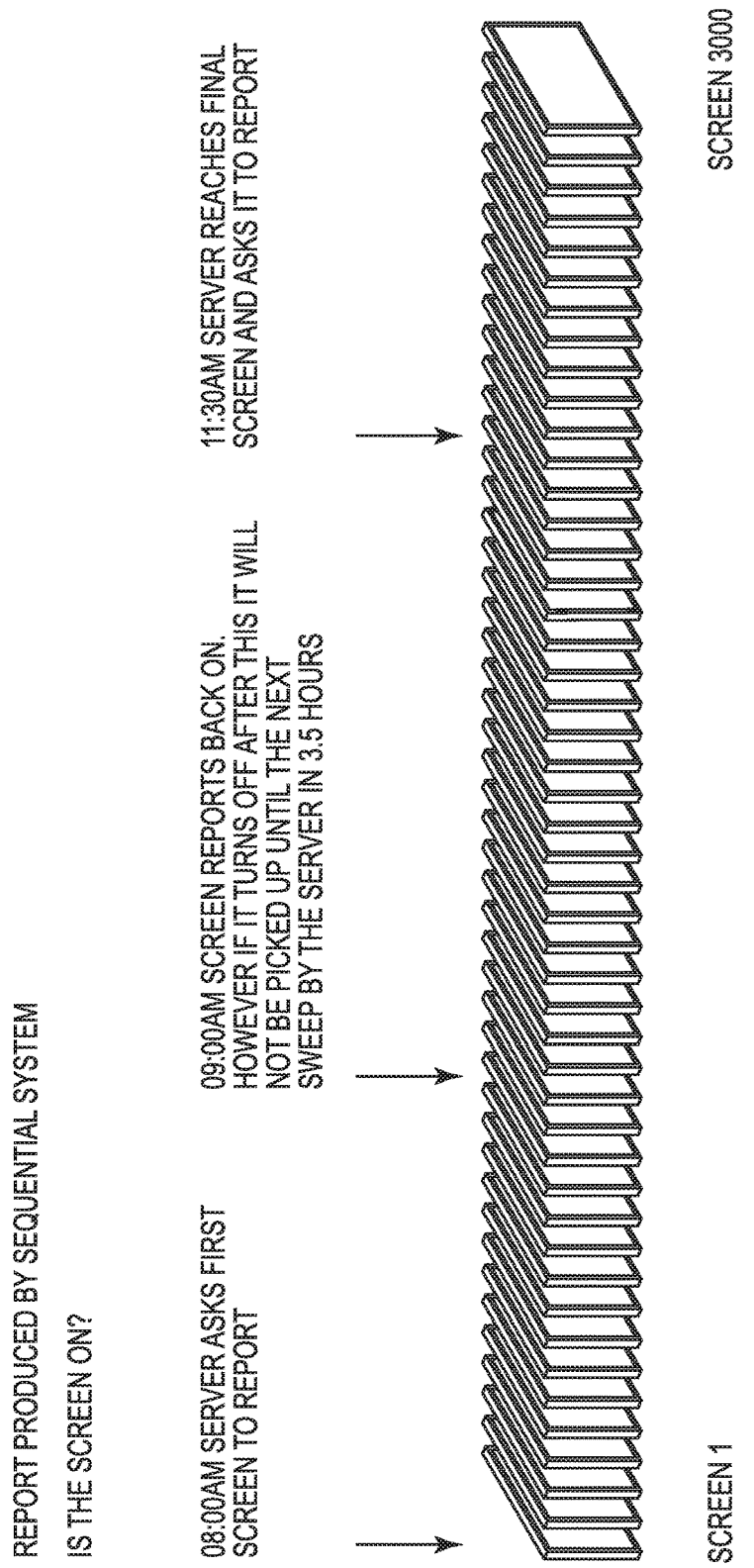
FIG. 2 illustrates a schematic diagram of how a sequential monitoring system generates display screen status reports according to the prior art.

Distributed monitoring systems and methods utilize one or more locally situated monitoring and control devices to monitor and control other locally situated network components such as display devices. The monitoring and control devices send status requests to, and receive status updates from, the monitored local network components. Based on the status updates, the monitoring and control devices may send commands to the one or more network components to take some action, such as adjusting the settings of a display device, and the monitoring and control device may confirm with the network component that the action was taken. A monitoring and control device generates reports based on the status updates and the actions taken, and provides the reports to a communicatively coupled, remotely located status viewing station. Based on the reports, a status viewing station may command the monitoring and control device to take some action, such as commanding the monitoring and control device to instruct the display devices to reboot. The distributed monitoring model enables the status viewing station to automatically receive update reports from the monitoring and control devices across the network, which is in contrast to the sequential model where the central server is required to poll the network components for status updates and wait for a response. The distributed monitoring system may be particularly useful in monitoring and managing the health of a digital signage network.

In some implementations, a distributed monitoring system for monitoring network components may include display devices, monitoring and control devices (e.g., computers for transmitting content to the display devices and for implementing monitoring software) for monitoring the display devices and other network components, and a remotely located status viewing station for receiving monitoring (e.g., status) updates. FIGS. 3A and 3B illustrate diagrams of distributed monitoring systems 300, 310, respectively, according to certain implementations. In a particular example, the display devices may be located at end caps within a retail store and may serve as digital signage displays, while the monitoring and control device may be located in an office within the retail store. In this example, the status viewing station may be in a separate location from the retail store, such as in a corporate office. In another example, the display devices may be located within a bank lobby and serve as digital signage displays for banking customers and the monitoring and control device may be located in a technician or a manager's office. In this example, the status viewing station may be in a separate location, such as in a third party-controlled office. It may be appreciated that the display devices and monitoring and control devices may be installed in other businesses or dwellings in addition to retail and bank settings.

With reference to the distributed monitoring systems 300, 305 of FIGS. 3A and 3B, respectively, the display devices 310 may include display screens and hardware and firmware for causing images to be displayed on the display screens. The display devices 310 may be one or more large format digital screens, televisions, computer monitors, touch screens, projectors or other display devices configured for displaying content for user viewing. The display devices 310 may include embedded firmware for configuration of the devices, as well as an onboard PC (including a processor and memory).

In some implementations, such as when a display device includes an onboard PC, the display device may be programmed to perform the functions of the monitoring and control device 320 described below. For example, the display device may perform monitoring functions, store content and execute instructions for displaying content on the display screen. In some implementations, the display device may be composed of one or more display screens communicatively coupled to a local player (e.g., video players, set top boxes, external computer processors and memory or other digital devices) configured to transmit content (e.g., videos and images) to the display device. The display devices 310 may be programmed to communicate with the local monitoring and control device 320 or another local or on-site computer system, described below.

As shown in FIGS. 3A and 3B, a monitoring and control device 320 associated with the display devices 310 may be a local or an on-site computer (e.g., a computer with a memory, processor and programmed with monitoring software for executing queries and sending query results to a remote location and may be configured to transmit content to the display devices 310) that is physically present at the location the display devices 310 are installed (e.g., within a store, a business or a dwelling). The monitoring and control device 320 utilizes a processor to execute monitoring software instructions, which for example, query the local display devices to determine the functional status of various display device parameters. For example, the monitoring and control device 320 obtains the information on hardware and firmware operational parameters within the display devices 310 by querying the display device. The monitoring software may additionally perform software checks on other software or programming to see if software and programming are running correctly on the monitoring and control device 320, the display devices 310 or other locally situated network components. The monitoring and control device 320 may take action in response to receiving query updates from the monitored network components, which may, for example, include fixing a problem associated with the network component that is repairable by remote servicing. The monitoring and control device 320 may generate and send a report to the remote status viewing station 340, described below. In addition to performing monitoring functions, the monitoring and control devices 320 may be programmed as a content player and may include software for archiving content therein and for transmitting content to the local display devices 310. In alternative implementations, the player may be integrated with one or more of the local display devices 310 as described above or may be a stand-alone component communicatively coupled to the monitoring and control device 320 and to one or more display devices 310.

The display devices 310, monitoring and control devices 320, and other monitored network components form a local monitoring and control environment 330 (e.g., an environment that is separate from the central server or status viewing station), and each of the components may be communicatively coupled via connections including, but not limited to, wired connections (e.g., RS-232 port connections, LAN cabling), wireless connections (e.g., Ethernet and switch for LAN and WAN, Wi-Fi) or both. For example, as shown in FIG. 3A, display devices 310 with an inbuilt RS-232 port may be connected to an RS-232 port interface. The display devices 310 may then be connected via a cable to the monitoring and control device 320 that also includes an RS-232 port. When using RS-232-based connections, an interface of the monitoring and control device 320 may be a DB-25 (25-pin) serial port or a DE-9 or (9-pin) serial interface, for example, and the display devices 310 may communicate over a 25-pin or 9-pin serial interface.

The RS-232 connection may be via a daisy chain or star method. The daisy chain method involves the onsite monitoring and control device 320 connecting to one of the display devices 310 by RS-232. The first display device is then connected to another display device and this is connected to a further display device, and so on, forming a digital daisy chain within the branch. Thus, only one display device is physically connected to the monitoring and control device 320, but the monitoring and control device 320 is communicatively coupled with all of the display devices 310 in the daisy chain. In the star method, the monitoring and control device 320 may be connected to all of the display devices 310 by splitting and in some cases splitting and boosting the RS-232 signal down multiple cables. This means that display devices 310 may be contacted even if there are other display device failures on site.

In some implementations, RJ-45 "Ethernet" style jacks (in other words a port that accepts an Ethernet style connector) may be provided in the display device. This may enable the display devices to be managed by the monitoring and control devices over TCP/IP (IP) as shown in FIG. 3B, rather than RS-232. In this case, the IP allows the display devices to connect to an Ethernet switch, thereby eliminating the need for a direct physical connection to the monitoring and control device 320. Accordingly, the local monitoring and control environment may be configured to send status requests, receive status updates and send commands for controlling the display devices utilizing both wide area network (WAN) and local area network (LAN).

A status viewing station 340 is located remotely from the display devices 310 and the monitoring and control devices 320 within the various local monitoring and control environment 330 in the network, and may be a device such as a PC or a set top box configured as a central server, which monitors the various network components of the local monitoring and control environments 330. The status viewing station 340 may be communicatively coupled to the monitoring and control devices 320 through a network connection, Internet connection or other communication means for sending data to and receiving data from remote locations. The status viewing station 340 may receive a file of status data generated by the remote monitoring and control devices 320, or the monitoring and control devices 320 may report the status data directly to the status viewing station 340 using web services or similar IP-based communications. The status viewing station 340 provides a visual display of the status of the network components within the network, and the network components may span across a number of remote locations. When a network component problem is identified, the visual display of the status viewing station 340 displays an error indicator, and details of the problem may be reviewed by a user by selecting the error indicator, described below.

In operation of the distributed monitoring systems, 300, 305, the display device firmware may use hexadecimal (HEX) commands in order to direct the display device to perform a certain action or to send back some information. HEX is a known number system used in computer applications to communicate with electronic hardware. HEX commands may correspond to certain functions such as powering on/off, entering numbers, selecting enter, increasing or decreasing a channel or volume, menu selections, cursor movements (e.g., up, down, left, right, previous and next). The number of HEX enabled commands and the code sequence may vary from vendor to vendor, but each display device using HEX commands may be utilized in the distributed monitoring systems 300, 305 to enable the monitoring and control device 320 to monitor and control the display device parameters. For example, the monitoring and control device may be programmed with HEX commands for one or more display device models and may communicate with the display device utilizing the HEX-based codes over an RS-232 interface or over TCP/IP (IP). Based on the information received from the display device in response to sending one or more HEX codes, the monitoring and control device 320 may take some action, described below. While communications between the components of the local monitoring and control environment are described as through HEX commands, it will be appreciated that communications may be based on other code types, which may be in addition or as an alternative to HEX codes.

Figure 4:
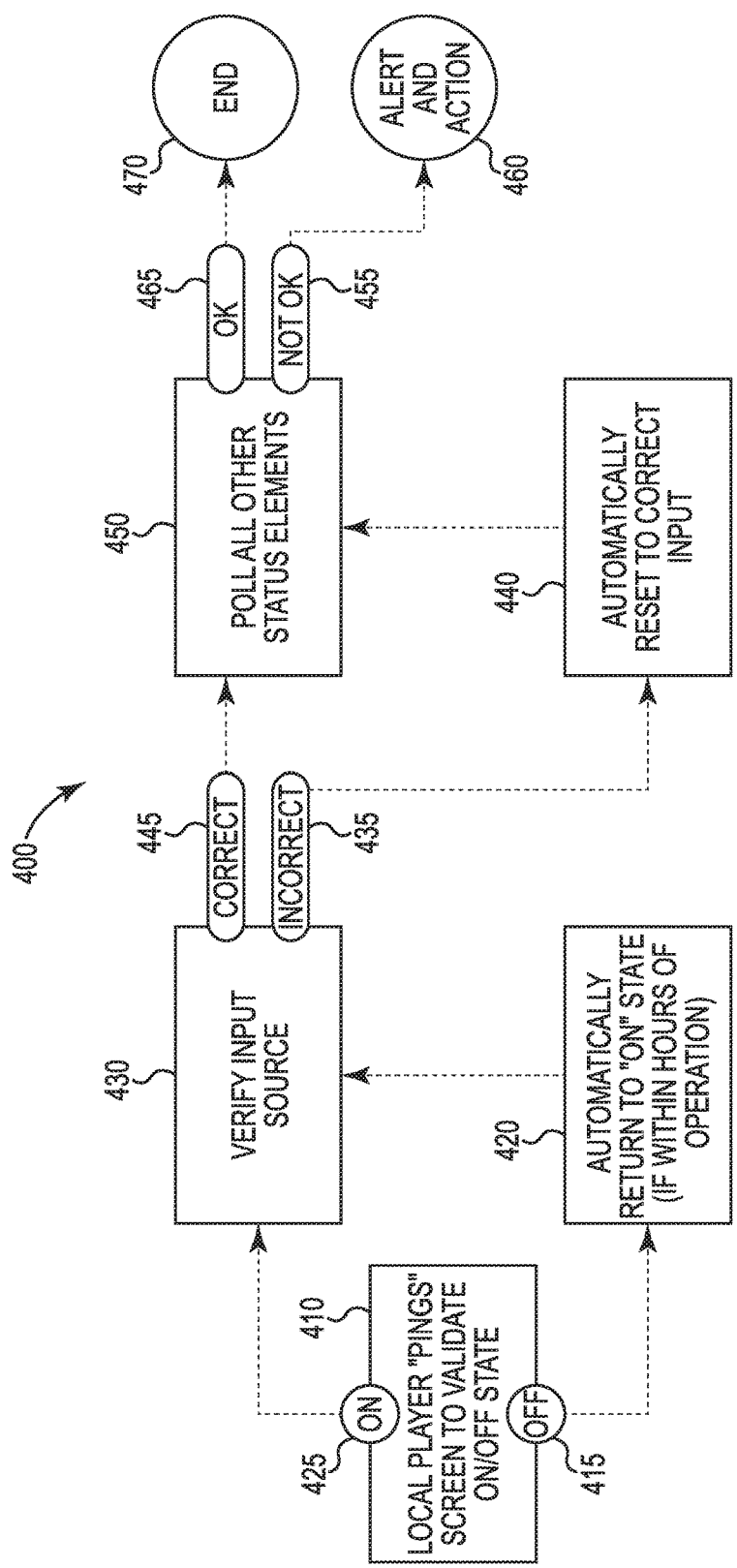
FIG. 4 illustrates a flowchart of a distributed monitoring method that may be implemented by the distributed monitoring systems of FIGS. 3A and 3B.

FIG. 4 illustrates a flowchart of an example distributed monitoring method 400 that may be implemented by one or both of the distributed monitoring systems 300, 305 of FIGS. 3A and 3B. In FIG. 4, the monitoring and control device 320 executes a screen monitoring process to monitor display device (e.g., screen) status of the display devices 310 by pinging each display device to validate an on/off state (operation 410), for example, utilizing a HEX inquiry. If the display device is off (operation 415), the monitoring and control device sends a HEX command to turn the display device on (operation 420). Once the monitoring and control device verifies the display device is on (operation 425), the monitoring and control device may request that the display device verify the input source to which the display device is set (operation 430). If the monitoring and control device determines the input source is incorrect (operation 435), the monitoring and control device sends a command to the display device to reset the display device to the correct input (operation 440). Once the monitoring and control device verifies the input source is determined to be correct (operation 445), the monitoring and control device polls other parameters associated with the display device (operation 450), and where the parameters are operating incorrectly (operation 455), sends commands to adjust the parameters (operation 460). Upon confirming the parameters are operating correctly (operation 465), the polling process ends (operation 470). For example, the display device parameters monitored by the monitoring and control device 320 may include, but are not limited to, on/off state; lamp state error/no error; temperature error/no error; display device settings (e.g., volume, mute, brightness, contrast, image settings, color settings, language display); loss of signal error/no error; actual device temperature; fan state error/no error; input source identification (e.g., HDMI/PC/Composite) and status error/no error; display device serial number and display device firmware number. In additional implementations, the monitoring and control device 320 may poll the stored content transmitted to or by the display device to determine whether the stored content is current. In additional implementations, the monitoring and control device 320 may poll the status of the software used to deliver the stored content to determine whether the correct version of the software is installed on the network component. Thus, for example, when the local player is provided as a standalone player with content and software stored therein, the monitoring and control device 320 polls the player content or software to determine the player is operating correctly.

In addition to monitoring parameters, the monitoring and control device 320 sends commands to the display devices 310 or other network components for taking action, such as adjusting settings or operating parameters to maintain the health of the distributed monitoring system 300, 305. For example, for parameters that are incorrect or that fall outside of operational parameters (e.g., in operations 455 and 460), the monitoring and control device 320 may automatically send HEX commands to make corrections or to adjust the display device parameters to acceptable operating parameters. Commands that may be sent by the monitoring and control device to perform pre-defined functions may include, but are not limited to, turning the display device on or off; switching the display device to an idle mode; setting the input for the display device; adjusting the display device settings; activating/deactivating the fan; and rebooting the display device. In response to performing the functions, the display device may send a confirmation to the monitoring and control device 320 that the function was executed. In some implementations, in response to receiving a status update indicating programming or software is outdated, the monitoring and control device 320 may retrieve and install updated programming or software in the monitoring and control device 320, the display devices 310 or other network components. Upon receiving the update, the network components may send a confirmation to the monitoring and control device that the update is complete. Therefore, in addition to the ability to monitor and diagnose the health status of the display devices, the distributed monitoring system 300, 305 may utilize the monitoring and control device 320 to proactively adjust display device settings and update network components and receive confirmation of the adjustments or updates to enable the monitored network components to operate within healthy parameters.

Upon verifying parameters are correct or upon adjusting the parameters and receiving confirmation of the adjustment, the monitoring and control device 320 may generate status reports based on data received from the display devices 310 or other network components. For example, the data received from the network components may be in response to the monitoring and control device 320 sending status queries for one or more of the aforementioned parameters or to verify one or more actions were taken. In addition or alternatively, the data transmitted by the network components to the monitoring and control device 320 may be scheduled. The data forming the report may include, but is not limited to, site identifiers (e.g., a branch name or identification number), the status of the site, network device identifiers (e.g., screen serial number and screen firmware number) for devices within the site, the status of the devices, whether an update or a fix on a network device was attempted and was successful or unsuccessful. The generated report may be sent by the monitoring and control device 320 to the status viewing station 340.

In some implementations, the monitoring and control device may be programmed to send codes to the display device in order to command the display device to perform an initial setup according to predefined parameters stored in the monitoring and control device. For example, utilizing the monitoring and control device, the display device may be turned on and the display device settings may be adjusted to predefined parameters, the channel may be set to predefined channel, software may be installed on the display device, and a testing protocol may be performed to verify display device setup is complete. The monitoring and control device may generate an initial setup report for the site and the network components within the site and may send the report to the status viewing station 340.

The status viewing station 340 may receive status reports from each monitoring and control device 320 in the network on a periodic basis, such as every five minutes. When the monitoring and control device 320 verifies the monitored network components are operating correctly, the monitoring and control device 320 may send information to the remote status viewing station 340 confirming the correct operation. When the monitoring and control device 320 determines one or more of the display devices 310 or the software is not operating correctly, and attempts to correct the problem utilizing the monitoring and control device are unsuccessful, the monitoring and control device 320 may send a report to the remote status viewing station 340 with information identifying the problem and a unique address or identifier associated with the affected network component. In cases where the problem may be resolved electronically, the status viewing station 340 may send commands to the monitoring and control device 320 instructing the monitoring and control device 320 to fix the problem. In one example, the status viewing station 340 may send the monitoring and control device 320 an updated content file that the monitoring and control device 320 utilizes to transmit content to the affected display device or devices or to update software within a network component. Where the network component problem cannot be solved by instructing the monitoring and control device 320 to perform electronic operations, the status viewing station 340 may send a notification or alert to the monitoring and control device 320 or to any other device (e.g., a local help desk work station) that the network component requires attention.

In some implementations, the decentralized approach taken by the distributed monitoring system reduces the amount of data transmitted between the status viewing station 340 and the local monitoring and control environment 330 by the monitoring and control devices 320 sending the status viewing station 340 report files or condensed data on a number of the monitored network components. For example, where all monitored network components are operating correctly, the monitoring and control device 320 may send only a short message (e.g., a small amount of data) that all of the network components within a branch are operational. This is in contrast to the prior sequential, centralized approach in which each monitored network component is required to send data on status to the central server. In another example, where the network components in a branch are operational, the monitoring and control device may simply contact the status viewing station 340 to confirm communicative coupling, but in this case transmitting a report may be unnecessary. Furthermore, data traffic from the status viewing station 340 to the monitoring and control devices may be reduced because the monitoring and control devices may proactively fix problems with the monitored network components without requiring input from the status viewing station 340. As a result, after performing the fix, the monitoring and control device 320 may report to the status viewing station 340 that a problem was fixed, and the status viewing station 340 may determine no further action is needed (e.g., may not contact the monitoring and control device) or may simply send an acknowledgement of the fix. This is in contrast to a central server used in the sequential approach, which may be required to transmit instructions to the network components to attempt a fix, wait for confirmation of the attempt and whether it was successful or unsuccessful, potentially retry the fix or attempt a new fix and wait for confirmation.

During installation of the distributed monitoring system 300, 305, a set of centrally hosted servers (e.g., web and database servers), such as the status viewing station 340 or another central server, may send files containing the monitoring software to the retail business-housed distribution servers for installation within the monitoring and control devices 320 and other network components. On-site monitoring and control devices 320 within branches of the retail business may synchronize file structures with the distribution server. In some implementations, content may be sent directly from the centrally hosted servers to the branches of the retail business, thereby bypassing the retail business-housed distribution servers. In each installation, the distributed monitoring system may be configured to enable the status viewing stations 320 to communicate directly or indirectly with the remote monitoring and control devices 340, and the monitoring and control devices 320 locally monitor and control their respective local network components. Therefore, sequential status checks performed by the status viewing station 340 may be unnecessary due to the on-site monitoring and control devices 320 performing the monitoring and control functions. Furthermore, because the distributed monitoring system 300, 305 checks status of the display devices 310 locally, status reports may be continuously sent to the remote status viewing station 340 from the monitoring and control devices across the network. This may enable the remote status viewing station 340 to be updated with the status of the network in real time. For example, each monitoring and control device within the network may send an update every few minutes (e.g., 5 minutes) so that for a 3000 branch retail business with monitoring and control devices at each branch, the status viewing station 340 may receive 10 network status updates per second. Furthermore, the updates and any associated alerts may be automatic, thereby removing the necessity of manual analysis of status reports. In addition, the status viewing station 340 may perform functions that enable the monitoring and control device to automatically fix and control the display devices.

In some implementations, such as when the distributed monitoring system 300, 305 is implemented in a bank setting, the remote monitoring system, e.g., status viewing station 340, may not connect directly to the monitoring and control devices 320 within the bank branches. This may avoid problems associated with non-secure access to bank networks. In this case, a distribution server may be provided between the status viewing station 340 and the monitoring and control devices 320 within the branches, and the status viewing station 340 may be securely connected to the distribution server (e.g., by secure VPN). In this example, the status viewing station 340 may send files to the distribution server, which synchronizes with the monitoring and control device 320. As a result, the local monitoring and control environment may only be accessed by the bank's distribution server, and the status viewing station 340 may only be communicatively coupled via a secure connection to the distribution server. Furthermore, access to the status viewing station 340 as well as access to the distribution server via the status viewing station 340 may be secure and only certain users may have administrative status with the distribution server while others are given only read and copy access, for example. In this example, when alerts are generated based on parameter falling outside of predefined ranges or settings, the alerts are sent by the monitoring and control device 320 to the distribution server (e.g., a server controlled by the retail business) and then the distribution server sends the alert to the status viewing station 340 (which may be controlled by the retail business or a third party).

Figure 5:
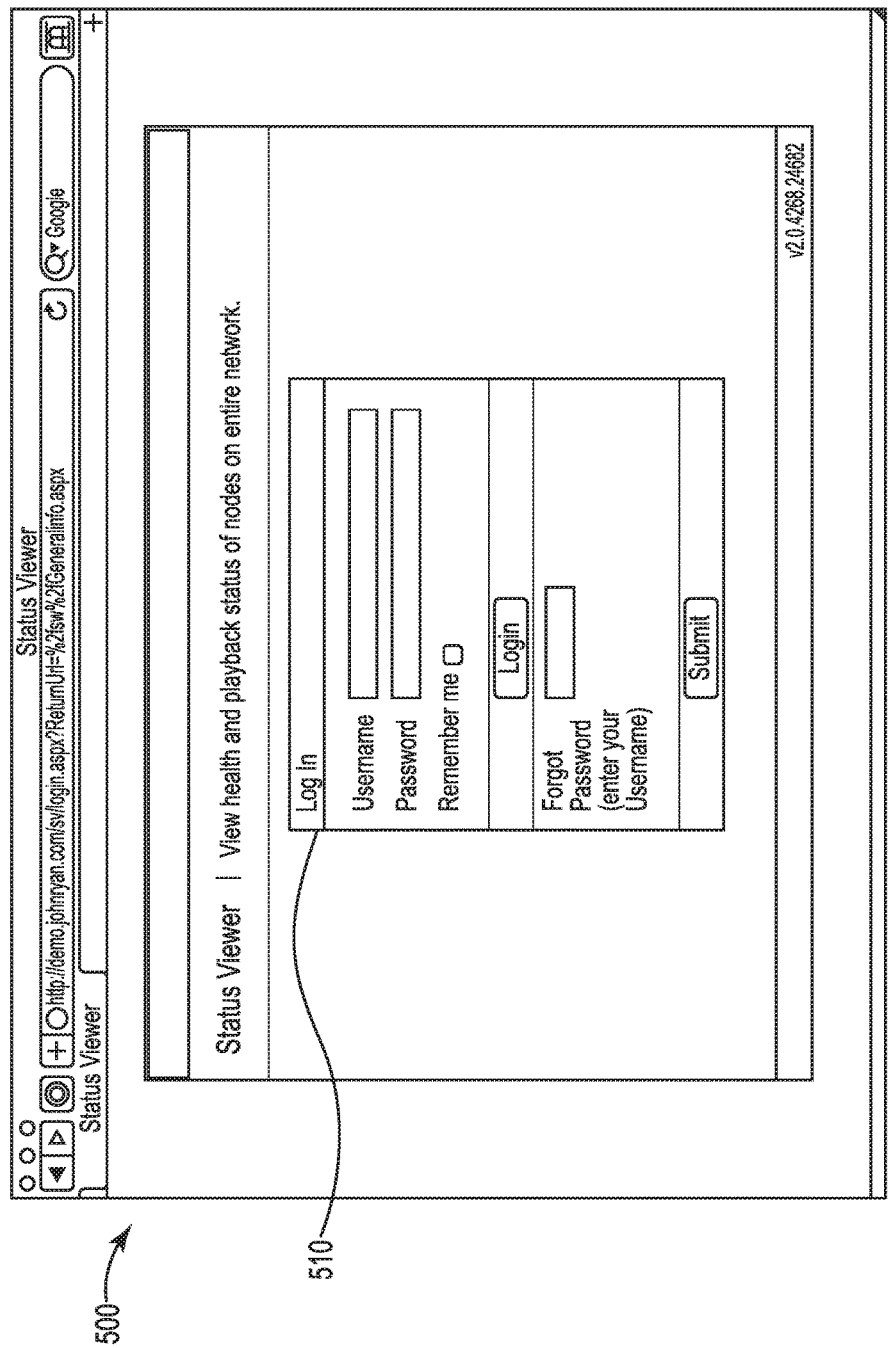
FIG. 5 is a screen shot of a login page for viewing a display interface of the status viewing stations according to certain implementations.

The status viewing station 340 includes a status viewer interface 500 that may be implemented by software or may be accessed by logging into a website. For example, as shown in FIG. 5, a login page 510 may be accessed via a website through any status viewing station 340 coupled to the Internet. The login page secure such as password protected to enable authorized users to access the distributed monitoring system. Thus, in theory, the status viewing station 340 may be accessed by a PC operating the monitoring and control software such as for maintenance and updating of the monitoring and control devices.

Figure 6:
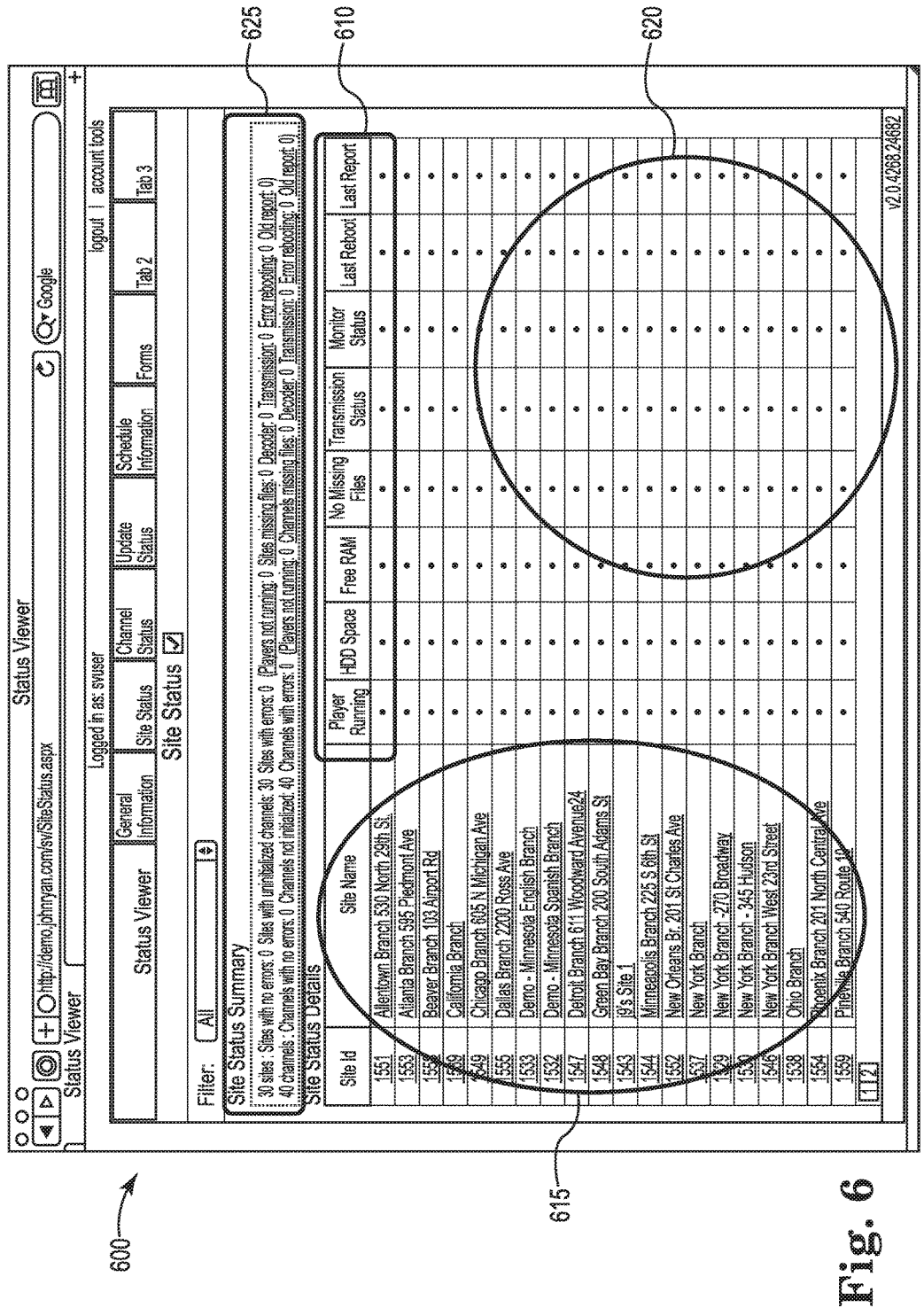
FIG. 6 is a screen shot of a site status tab that displays the status of various monitored parameters including the status of the monitoring and control devices and the display devices according to certain implementations.

Upon accessing the status viewer interface 500, one of a number of tabs may be selected by the user for viewing the status of various aspects of the monitored display devices 310 and other network components. In FIG. 6, the site status tab 600 displays an overview of monitored parameters 610, e.g., network health parameters, for devices or branches 615 as a series of status indicators 620 (e.g., red, green, yellow indicators) or other warning or alert indicators (e.g., number values, star ratings, arrows or other symbols). The indicators 620 may represent that the parameter is within acceptable ranges (e.g., a green indicator), the status of the parameter is pending (e.g., a yellow indicator) or that a problem with the parameter has been identified (e.g., a red indicator). Each parameter monitored within a display device or at a branch may be associated with a status indicator 620 or each display device or branch monitored may be associated with a status indicator 620. Thus, as hardware, firmware and software status falls outside of pre-set limits, these are reported as error conditions for the particular device or for the branch housing the device.

FIG. 6 illustrates some examples of parameters 610 that may be monitored for each branch and displayed by the status viewer interface 500. The monitored parameters 610 may be network health parameters on a branch-by-branch basis and may include: monitoring and control device running status (e.g., whether the monitoring and control device software is running correctly); hard disk drive (HDD) space (e.g., whether there is enough HDD space available); free RAM (e.g., whether there is enough free RAM); no missing files (e.g., if the monitoring and control device is asked to play a file that is not there, the monitoring and control device reports the missing file); transmission status (e.g., test files may be sent from a messaging manager such as from the status viewing station 340 at a pre-determined interval; and the receipt of these files may be checked and if the files are older than 2 hours, an error is reported); monitor status (e.g., display device status); last reboot (e.g., whether the last scheduled reboot occurred); last report (e.g., whether the site has reported in a specified time frame) and other network component health-related parameters. In one example, when the display device is not powered on during operating hours, the interface 500 may display a warning status indicator for the given display device or for the branch at which the display device is located.

Furthermore, the site status tab 600 includes a site status summary 625 providing a summary of the sites and channels within the status viewing station 340 network. The summary may provide the total number of sites and channels within the network and may list the number of sites and channels operating within expected parameters (e.g., sites with no errors), with pending parameters (e.g., sites with un-initialized or pending parameters), and those falling outside of expecting operating parameters (e.g., sites with errors detected such as players not running, files missing, decoder errors, transmission errors, rebooting errors and out-of-date report errors).

In some implementations, the user viewing the site status tab 600 may access detailed data (e.g., stored in memory associated with the status viewing station 340 or accessible via a web connection) for the hardware device or software for the site device experiencing the problem through the status viewing interface 500. This detailed data may provide specific information on the error conditions and the type (e.g., model and/or unique identifier) of device experiencing the problem. In some cases, a message may be associated with a persisting error condition, such as for a display device that requires manual repair. In this case, the user may access the message by selecting the indicator corresponding to the branch and device parameter affected, or by selecting other information associated with the branch or display device. In addition or alternatively, the status viewing station 340 may attempt to cause the display device problem to be fixed by determining the correct HEX codes for turning on and/or rebooting the display device. The status viewing station 340 may send updated HEX code information to the monitoring and control device 320 and instruct the monitoring and control device 320 to attempt to fix the problem. If the monitoring and control device is unsuccessful in causing the display device to power on, or reboot and power on, using the updated HEX codes, then the monitoring and control device 320 may return a report indicating the status viewing station 340 instructions were executed but were unsuccessful. In this case, the status viewing station 340 may send a notification to the monitoring and control device 320 or to another device indicating that the display device requires manual repair. In some implementations, the notification may be provided in the form of a service request to a technician's PC communicatively coupled to the distributed monitoring system.

Figure 7:
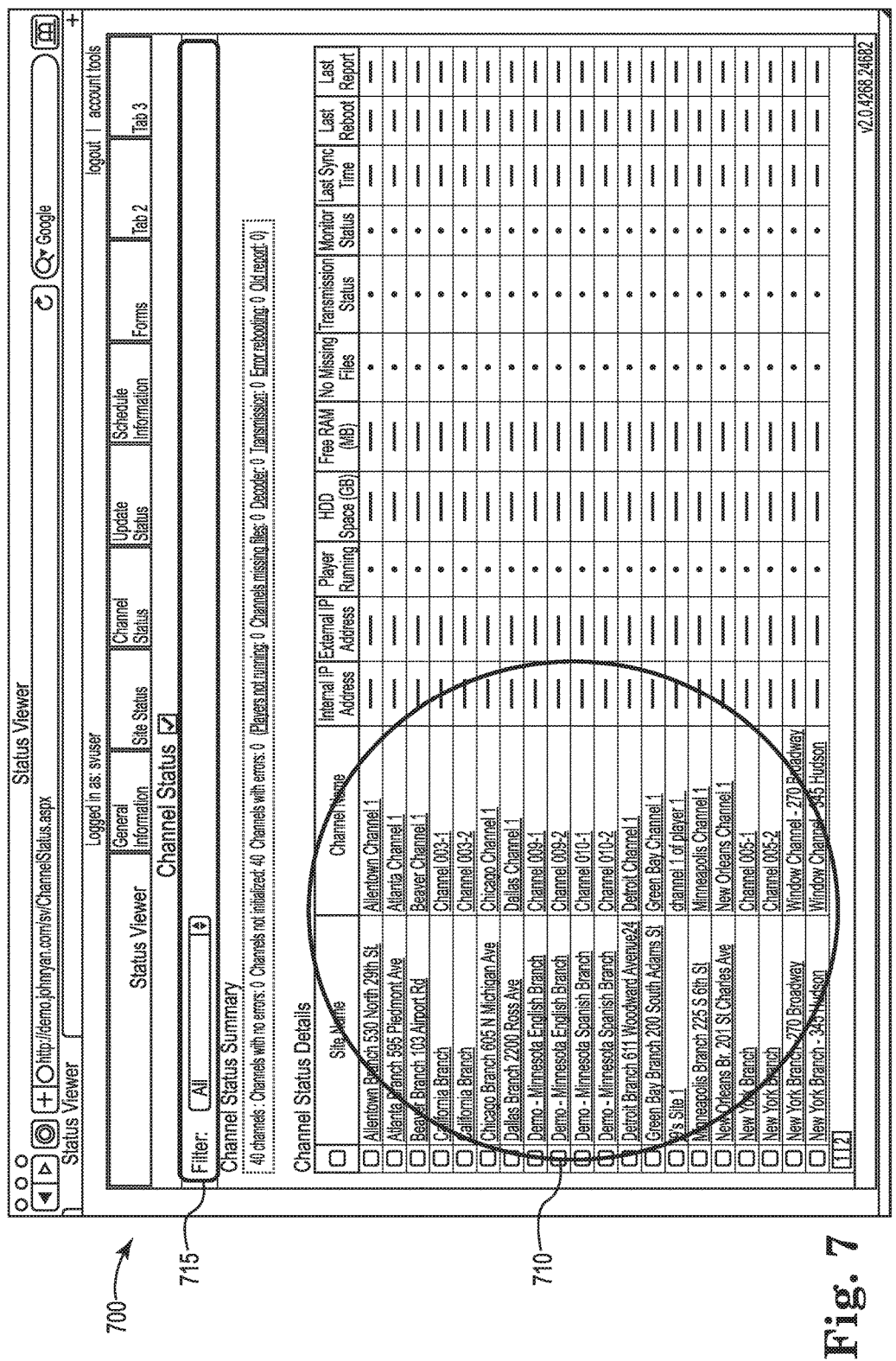
FIG. 7 is a screen shot of a channel status tab that enables identification of problems associated with a channel in a given location according to certain implementations.

In FIG. 7, the channel status tab 700 may enable a user to view details of the network components within the branches in order to isolate problems. For example, when a site (e.g., a branch) supports more than one channel (e.g., more than one set of programming content transmitted by the network components to the display devices within a branch), the channel status tab 700 may display the various channels 710 (e.g., the specific channels in various branches) within the site and the affected channel may be isolated. In some implementations, the channel status tab 700 may be provided in addition to or as an alternative to a device status tab or a programming status tab to enable the user to view the display device or the programming experiencing a problem. According to FIG. 7, parameters that may be displayed on the channel status tab 700 that may be in addition to the parameters displayed in the site status tab 600 of FIG. 6 include the channel name, the internal IP address associated with the channel, the external IP address associated with the channel and the last synchronization time. In addition, FIG. 7 provides a results filter 715 that enables the user to filter results by parameter type or by problem type in order to produce a list of sites or channels with a selected parameter or problem type. This results filter may be provided in each of the various tabs to enable filtering by parameter or problem type.

Figure 8:
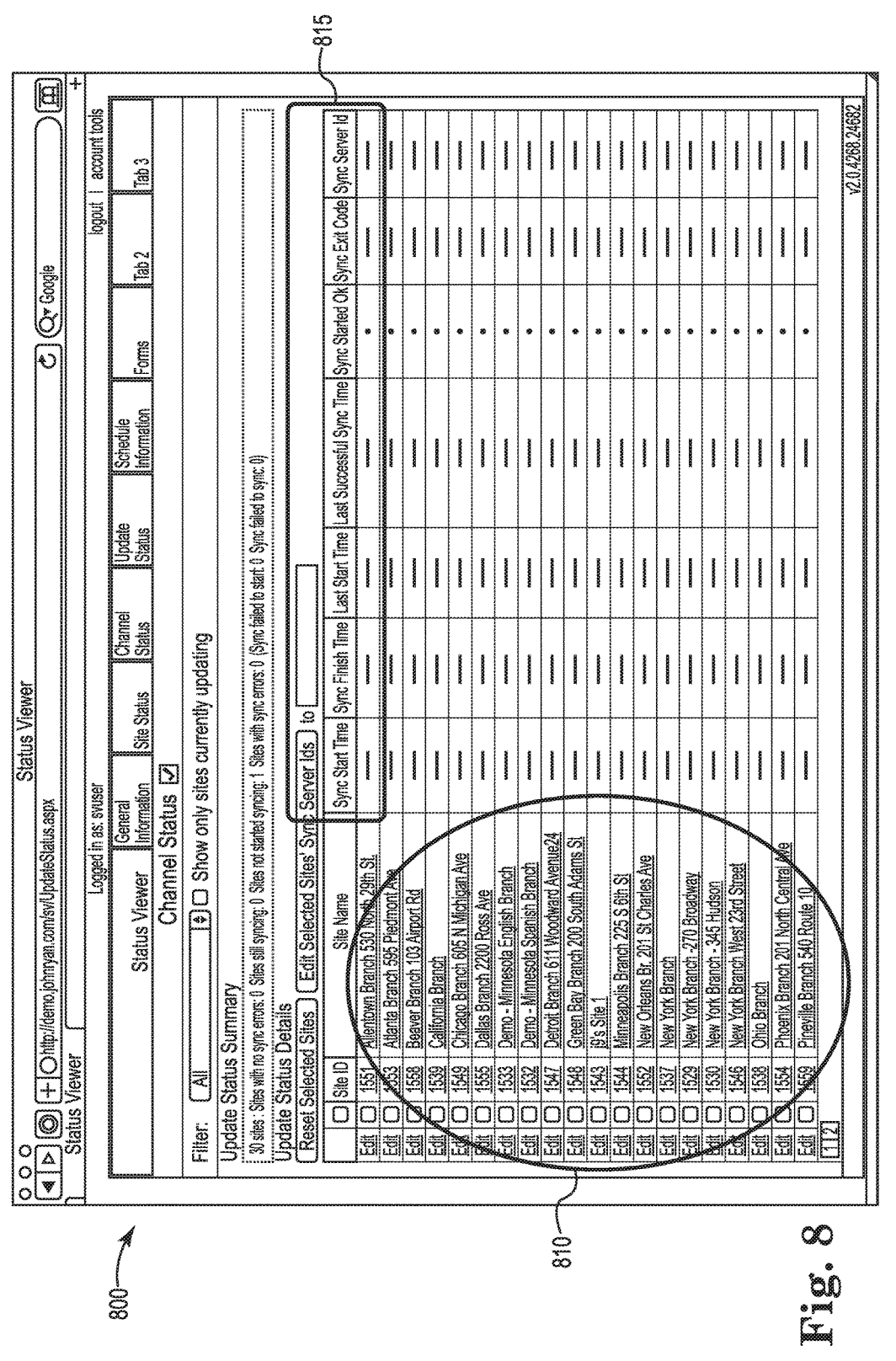

In FIG. 8, the update status tab 800 enables a user to view the status of updates implemented across the network of monitored components. In FIG. 8, the branches and/or site identifiers may identify the monitored branch 810, and the status of the update of the network component within the branch may be tracked based on receiving reports from the monitoring and control devices 320 for player update parameters 815 including but not limited to: synchronization start time; synchronization end time; the last synchronization time; the last successful synchronization time; whether the synchronization has started; the synchronization exit code; and the synchronization server identification. The user is therefore able to view the status of synchronizations across the network. Synchronization monitoring also enables the business to confirm that content files are correctly distributed to the monitoring and control devices 310 within the branches supported by the business. In some implementations, the status viewing station 340 may receive reports from the monitoring and control devices 320 indicating the synchronization of content was unsuccessful, and in response, the status viewing station 340 may automatically debug content and send the updated content to the monitoring and control device for installation and/or transmission.

Figure 9:
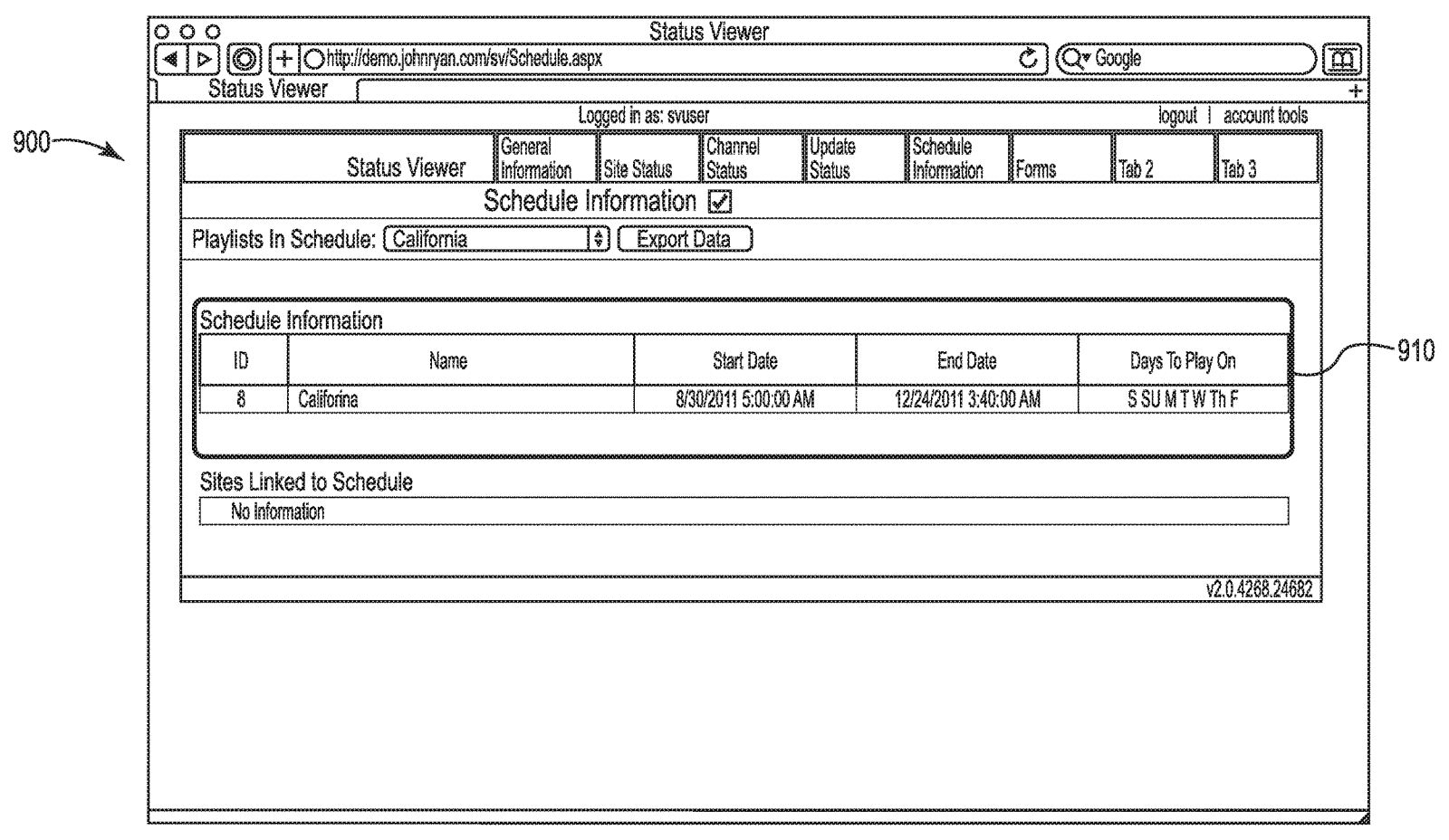

In FIG. 9, the schedule information tab 900 may enable users to view a content scheduler 910 with its associated playlists scheduled to play on the display devices 310 across the network as well as the date the playlists will begin to play and end playing and the days of the week the playlists are to be played. Specific spots within the playlists may be viewed by the user, and in some implementations, the components that make up each spot may be viewed. This may enable a user to precisely and quickly ascertain the content that is playing or that is scheduled to be played across the network. Those skilled in the art will appreciate the lines depicted in FIGS. 6-9 represent information applicable to the operating information and parameters associated with the distributed monitoring system of the present disclosure.

Figure 10:
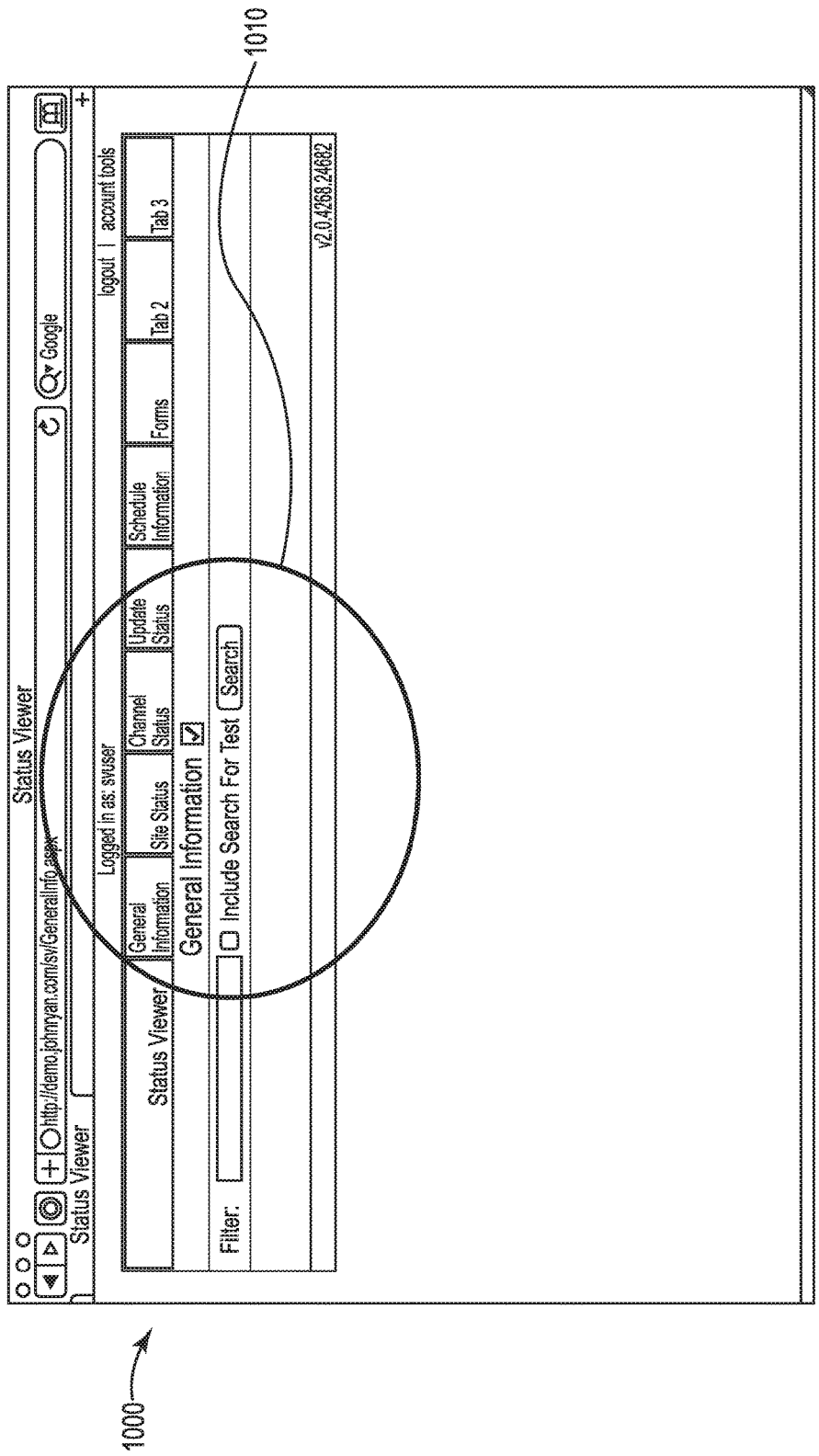
FIG. 10 is a screen shot of a general information tab that may enable the user to perform a network wide search of specific criteria by entering the search criteria in the filter field according to certain implementations.

In FIG. 10, the general information tab 1000 may enable the user to perform a network wide search of specific criteria by entering the search criteria in the filter field 1010.

Example

The following example provides a representative specification outline for a screen monitoring application that may be implemented by the distributed monitoring system provided according to certain implementations. This screen monitoring application may serve as a check application for a number of LCD/LED screens (e.g., display devices), which are linked to monitoring and control devices and each monitoring and control device sends data to (e.g., status checks) and receives data from (e.g., status reports) the display devices. The communication between the monitoring and control device and its connected display devices may be through serial RS232 or IP port. The specification outline includes information specific to Samsung monitors but may be adjusted for any manufacturer's display devices.

Application Requirements:

Some requirements for the screen monitoring application may include, but are not limited to, one or more of the following: 1) console mode, where the EXE is run at a command prompt; 2) service mode, where the EXE is installed as a windows service; 3) configuration file for general application settings, such as the time to pole the display devices (in seconds), folder to save the response XMLs, log mode on/off where the application logs its last event; 4) XML schema defining the display device commands and return values; and 5) XML Schema defining the output response files, which are then interpreted by the third party application (status viewer). The application may run on Windows XP and above (Vista, windows 7) or other platforms.

Outcome and Configuration Requirements:

The screen monitoring application may be configured to implement certain application logic and rules such as: 1) the display device monitoring may only occur when the display devices are on, hence the time nodes; 2) interval rules may set the time in minutes between checks; 3) if the display device power is returned as OFF in the status inquiry, then the screen monitoring application will send an ON command and then retry the status. If the display device powers on, then no error is reported. If the display device does not power on then an error is reported; 4) if the input source data command does not return the correct number (between 14 and 22) returned setting on the send line is sent. The status should then be rechecked by the screen monitoring application and reported if still in error. This provides a check to determine if the display device has a specific input source (HDMI, etc.), and if it does not, the screen monitoring application sends a command to set the display device to the correct input source; 5) the return is what you are expecting with Display Status Control command (0, 75) being an acceptable range or a simple 1 or 0, 0 being normal. Any variation in this causes the error flag in the data file created by the application to be set.

Command XML Schema:

A command XML schema defines the commands that are to be sent to each display device at specific times, and at specific intervals. Each display device can have a different set of times, as well as a different set of commands. Each display device is referenced by a unique hexCode and each of the codes used to operate the display device for multiple models of display devices may be programmed into the monitoring and control device.

The schema below for display device (e.g., screen) one states that between 18:00 and 20:00 on Monday to Saturday, commands 1, 2, and 3 are sent to the display device, and the return values placed in the output XML (see below).

The interval is in minutes, and the schema example file is bundled with this document (configuration.xml). The serial port connectionString and outputFilePath is also given in this configuration.xml

```
<?xmlversion="1.0"encoding="utf-8"?>
<Screen_Monitoring>
    <Interval>
        15
    </Interval>
    <connectionString>
        <![CDATA[9600,1,0,n]]>
    </connectionString>
    <outputFilePath>
<![CDATA]c:\johnryan\screenmonitor\output.xml]]>
    </outputFilePath>
    <Screens>
        <ScreenID="1">
            <Times>
    <TimedayOfTheWeek="1"startTime="18:00"endTime="20:00"status="on"></Time>
    <TimedayOfTheWeek="2"startTime="18:00"endTime="20:00"status="on"></Time>
    <TimedayOfTheWeek="3"startTime="18:00"endTime="20:00"status="on"><Time>
    <TimedayOfTheWeek="4"startTime="18:00"endTime="20:00"status="on"></Time>
    <TimedayOfTheWeek="5"startTime="18:00"endTime="20:00"status="on"></Time>
    <TimedayOfTheWeek="6"startTime="18:00"endTime="20:00"status="on"></Time>
    <TimedayOfTheWeek="7"startTime="00:00"endTime="24:00"status="off"></Time>
            </Times>
            <Commands>
                <CommandID="1"loopTries="1">
                    <sendCommand>
                        <![CDATA[Display Status Control (Page18, returns Lamp error 0 or 1, Temperature 0 or 1, bright sensor 0 or 1, No sync 0 or 1, Current temp xx, Fan error 0 or 1)]]>
                    </sendCommand>
                    <expectedReturn>
                        <![CDATA[Return 0,0,0,0,(0,75),0]]>
                    </expectedReturn>
                    <onErrorEvent>
                        <![CDATA[Report into the output XML that an unexpected value is returned]]>
                    </onErrorEvent>
                </Command>
                <CommandID="2"loopTries="1">
                    <sendCommand>
                        <![CDATA[Get On Off status (Page 22, Returns 0 or 1)]]>
                    </sendCommand>
                    <expectedReturn>
                        <![CDATA[1]]>
                    </expectedReturn>
                    <onErrorEvent>
                        <![CDATA[Send the set command to the expected return, in effect this checks if the screen is on (1), and if not sends it a command to turn it on. If this fails (loopTries), then an error is reported in the output XML]]>
                    </onErrorEvent>
                </Command>
                <CommandID="3"loopTries="1">
                    <sendCommand>
                        <![CDATA[Input source data (Page 25, returns Input source code)]]>
                    </sendCommand>
                    <expectedReturn>
                        <![CDATA[14]]>
                    </expectedReturn>
                    <onErrorEvent>
                        <![CDATA[Send the set command to the expected return (14). in effect this checks if the screen input is 14 (HDMI) and if it is not then it sends a command to set it to 14 (HDMI). If this fails (loopTries), then an error is reported in the output XML]]>
                    </onErrorEvent>
                </Command>
            </Commands>
```

```xml
        </Screen>
        <ScreenID="2">
            <Times>
                <TimedayOfTheWeek="1"startTime="09:00"endTime="18:00"status="on"></Time>
                <TimedayOfTheWeek="2"startTime="09:00"endTime="18:00"status="on"></Time>
                <TimedayOfTheWeek="3"startTime="09:00"endTime="18:00"status="on"></Time>
                <TimedayOfTheWeek="4"startTime="09:00"endTime="18:00"status="on"></Time>
                <TimedayOfTheWeek="5"startTime="09:00"endTime="18:00"status="on"></Time>
                <TimedayOfTheWeek="6"startTime="09:00"endTime="18:00"status="on"></Time>
                <TimedayOfTheWeek="7"startTime="00:00"endTime="24:00"status="off"></Time>
            </Times>
            <Commands>
                <CommandID="1"loopTries="1">
                    <sendCommand>
                        <![CDATA[Display Status Control (Page18, returns Lamp error 0 or 1, Temperature 0 or 1, bright sensor 0 or 1, No sync 0 or 1, Current temp xx, Fan error 0 or 1)]]>
                    </sendCommand>
                    <expectedReturn>
                        <![CDATA[Return 0,0,0,0,(0,75),0]]>
                    </expectedReturn>
                    <onErrorEvent>
                        <![CDATA[Report into the output XML that an unexpected value is returned]]>
                    </onErrorEvent>
                </Command>
                <CommandID="2"loopTries="1">
                    <sendCommand>
                        <![CDATA[Get On Off status (Page 22, Returns 0 or 1)]]>
                    </sendCommand>
                    <expectedReturn>
                        <![CDATA[1]]>
                    </expectedReturn>
                    <onErrorEvent>
                        <![CDATA[Send the set command to the expected return, in effect this checks if the screen is on (1), and if not sends it a command to turn it on. If this fails (loopTries), then an error is reported in the output XML]]>
                    </onErrorEvent>
                </Command>
                <CommandID="3"loopTries="1">
                    <sendCommand>
                        <![CDATA[Input source data (Page 25, returns Input source code)]]>
                    </sendCommand>
                    <expectedReturn>
                        <![CDATA[14]]>
                    </expectedReturn>
                    <onErrorEvent>
                        <![CDATA[Send the set command to the expected return (14). in effect this checks if the screen input is 14 (HDMI) and if it is not then it sends a command to set it to 14 (HDMI). If this fails (loopTries), then an error is reported in the output XML]]>
                    </onErrorEvent>
                </Command>
            </Commands>
        </Screen>
    </Screens>
</Screen_Monitoring>
```

Hex Commands:

The commands contained in the sendCommand node as well as any expectedReturn nodes may be in hex format. Some examples (using a Samsung screen as reference) are:
Status sendCommandstatus_00.hex: AA 20 20 20 20
Status sendCommand status_01.hex: AA 20 01 20 01
Status sendCommandDisplay status_01.hex: AA 0D 01 20 0E
On/Off sendCommandPowerOFF_00.hex: 3F 41 3F
Input Source sendCommand PCinput_02.hex: AA 14 02 01 14 2B Output XML Schema:

The commands are run per display device as defined above, at set times of the day. If any errors are reported (as in after the onErrorEvent has been executed and tested, the system still does not return (expectedReturn) then an XML file is written out to a directory given in the configuration file for the application. This output XML file, takes the form:

```xml
<?xmlversion="1.0"encoding="utf-8"?>
<Screens screenErrors="1,2">
    <ScreenID="1">
        <!--the lamp, temperature, bright sensor, no sync, current
        temperature, fan error codes come from the Display Status Control
        command-->
        <Lamp>
            <![CDATA[0]]>
        </Lamp>
        <currentTemperatureError>
            <![CDATA[0]]>
        </currentTemperatureError>
        <BrightSensor>
            <![CDATA[0]]>
        </BrightSensor>
        <noSync>
            <![CDATA[0]]>
        </noSync>
        <currentTemperatureValue>
            <![CDATA[56]]>
        </currentTemperatureValue>
        <Fan>
            <![CDATA[0]]>
        </Fan>
        <!--power on/off comes from get on/off status-->
        <Power>
            <![CDATA[1]]>
        </Power>
        <!--input source comes from the input source command-->
        <inputSource>
            <![CDATA[14]]>
        </inputSource>
    </Screen>
    <ScreenID="2">
        <!--the lamp, temperature, bright sensor, no sync, current
        temperature, fan error codes come from the Display Status Control
        command-->
        <Lamp>
            <![CDATA[0]]>
        </Lamp>
        <currentTemperatureError>
            <![CDATA[0]]>
        </currentTemperatureError>
        <BrightSensor>
            <![CDATA[0]]>
        </BrightSensor>
        <noSync>
            <![CDATA[0]]>
        </noSync>
        <currentTemperatureValue>
            <![CDATA[56]]>
        </currentTemperatureValue>
        <Fan>
            <![CDATA[0]]>
        </Fan>
        <!--power on/off comes from get on/off status-->
        <Power>
            <![CDATA[1]]>
        </Power>
        <!--input source comes from the input source command-->
        <inputSource>
            <![CDATA[14]]>
        </inputSource>
    </Screen>
</Screens>
```

This schema example is bundled with this document (output.xml). The filename and path of this output file should be given in the application configuration file.

The screenError attribute to the Screens node is a comma delimited list of any display device ID's which have an error. If any (even if it's just one of the items) of the information in the <screen> node such as lamp, bright sensor etc. are in error (as in value 1 as opposed to 0), then this flags this display device as having an error, and therefore the screenError attribute of the <screens> node should be populated with the display device ID or ID's.

Status Viewer:

A central website may show the health status of site monitoring and control device's software and associated hardware devices. The health of each element is displayed as an indicator such as a green, yellow or red light. The associated site and sub zone information may be linked to each element. The output.xml file is reported back to the central website to allow instantaneous viewing of the display device health and other hardware and software information across the network, as each site machine will be sending the health information back continuously. If a site's display devices have an error, then the indicator on the central web site will turn from a green light to red. When this light is clicked the data from the output xml file may be read.

Aspects of the implementations may be provided as a computer program product, or software, that may include a non-transitory machine-readable medium having stored thereon instructions used to program a computer system (or other electronic devices) to perform a process or both. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The present disclosure and many of its attendant advantages may be understood by from the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. For example, the screen monitoring application described in the example above is not limited to code for executing queries and receiving responses from display devices, and may additionally be utilized for monitoring other network components within the distributed monitoring system. In addition, while the distributed monitoring system is described as having one status viewing station 340, it will be appreciated that multiple status viewing stations may be utilized. Moreover, the monitoring and control devices may report to multiple status viewing stations or distribution servers.

While the present disclosure has been described with reference to various embodiments, it will be understood that these embodiments are illustrative and that the scope of the disclosure is not limited to them. Many variations, modifications, additions, and improvements are possible. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A digital signage network configured with a distributed monitoring system for monitoring and controlling network components, the digital signage network comprising:
    a plurality of local monitoring and control environments each comprising a monitoring and control device and network components, the network components comprising a content player configured to transmit content to display devices within the local monitoring and control environment, wherein the monitoring and control device is configured to:
    detect and fix problems at the content player,
    assemble a report of an operational status for the local monitoring and control environment using information about the detected and fixed problems, and
    transmit the operational status report; and
a status viewing station remotely located from the local monitoring and control environments, wherein the status viewing station comprises a processor configured to:
    receive the transmitted operational status reports from each local monitoring and control environment, and
    generate a display listing an operational status of each local monitoring and control environment based on the plurality of reports received.

2. The system of claim 1, wherein the content player is a stand-alone component communicatively coupled to the monitoring and control device.

3. The system of claim 1, wherein the monitoring and control device is configured to fix problems with the content player without requiring input from the status viewing station.

4. The system of claim 1, wherein the monitoring and control device is further configured to determine the content player is operational, and in response, contact the status viewing station to confirm communicative coupling without transmitting a report.

5. The system of claim 1, wherein the monitoring and control device is further configured to report to the status viewing station that a problem was fixed.

6. The system of claim 5, wherein in response to receiving an indication the problem was fixed, the status viewing station performs at least one of the steps of: determining no further action is needed or sending an acknowledgement that the problem was fixed.

7. The system of claim 1, wherein the monitoring and control device is configured to detect and fix problems by polling parameters associated with the content player.

8. The system of claim 1, wherein the operational status of the content player is detected in response to the monitoring and control device sending a status query.

9. The system of claim 1, wherein the operational status of the content player is detected by the monitoring and control device in response to the content player sending a scheduled status update.

10. The system of claim 1, wherein the content player is configured to store content for multiple channels, and wherein the operational status report comprises information about an operational status of the content for each of the multiple channels.

11. A digital signage network configured with a distributed monitoring system for monitoring and controlling network components, the digital signage network comprising:
a plurality of local monitoring and control environments each comprising a monitoring and control device and network components, the network components comprising a content player configured to transmit content to display devices within the local monitoring and control environment, wherein the monitoring and control device is configured to:
    receive updates for programming or software,
    install the updates for programming or software in the content player,
    assemble a report of an operational status for the local monitoring and control environment using information about the installed updates, and
    transmit the operational status report; and
a status viewing station remotely located from the local monitoring and control environments, wherein the status viewing station comprises a processor configured to:
    receive the transmitted operational status reports from each local monitoring and control environment, and
    generate a display listing an operational status of each local monitoring and control environment based on the plurality of reports received.

12. The system of claim 11, wherein the content player is a stand-alone component communicatively coupled to the monitoring and control device.

13. The system of claim 11, wherein upon receiving the update, the content player is configured to send a confirmation to the monitoring and control device that the update is complete.

14. The system of claim 11, wherein the assembled report comprises one or more of: site identifiers of the local monitoring and control environment, a status of the site, network device identifiers for devices within the site, a status of the content player, or whether the installation of the programming or software updates was successful or unsuccessful.

15. The system of claim 11, wherein the monitoring and control device is further configured to determine the content player is operational, and in response, contact the status viewing station to confirm communicative coupling without transmitting a report.

16. The system of claim 11, wherein the monitoring and control device is configured to detect and fix problems by polling parameters associated with the content player.

17. The system of claim 11, wherein the operational status of the content player is detected in response to the monitoring and control device sending a status query.

18. The system of claim 11, wherein the operational status of the content player is detected by the monitoring and control device in response to the content player sending a scheduled status update.

19. The system of claim 11, wherein the content player is configured to store content for multiple channels, and wherein the operational status report comprises information about an operational status of the content for each of the multiple channels.

* * * * *